Oct. 31, 1967  L. FONO  3,349,726
METHOD FOR PANCAKE PRODUCTION
Filed Aug. 16, 1965  2 Sheets-Sheet 1

INVENTOR.
Laszlo Fono
BY
Attorney

Oct. 31, 1967  L. FONO  3,349,726
METHOD FOR PANCAKE PRODUCTION
Filed Aug. 16, 1965                     2 Sheets-Sheet 2

INVENTOR.
Laszlo Fono
BY
Attorney

United States Patent Office 3,349,726
Patented Oct. 31, 1967

3,349,726
METHOD FOR PANCAKE PRODUCTION
Laszlo Fono, 3221 Fillmore St.,
San Francisco, Calif. 94123
Filed Aug. 16, 1965, Ser. No. 479,744
4 Claims. (Cl. 107—54)

This invention relates to the art of producing high quality pancakes, "crepes," "palascintas" and the like, having unique properties. More specifically it relates to varieties of pancakes which are extremely thin. These are well known in continental cuisines and different varieties are referred to as French, German, Russian, or Hungarian pancakes. They often form the base for the baking of the well known "crepes suzette" in the case of the French and the famous "blini" in the case of the Russian. A particularly unusual variety is the Hungarian known as the "palascinta." To properly prepare the many applications of these varieties, the basic pancake must be very thin. In fact, paper thinness is required in some cases. In addition to this, the pancake must be uniform, smooth, without wrinkles or holes, and thoroughly cooked or baked throughout its thickness. This is especially true of the many varieties of the Hungarian "palascinta" which often comprises a combination of meats, cheese, various jellies, jams, and other delicacies which have been rolled into or otherwise combined with the basic pancake and further cooked and processed.

Present practice in the art has generally consisted of the following steps. Any desired batter is first prepared of the suitable consistency, as more fully described below. A shallow frying pan or skillet is heated and a few drops of oil or butter are dropped into it. A small quantity of batter is then placed in the skillet and the latter is tipped and rotated so that the batter would coat the bottom of the skillet as uniformly as possible. The pancake is then cooked or baked over a fire for a few minutes on one side and then is turned over, either by means of a spatula or by flipping into the air, and then cooked or baked on the opposite side. When completely cooked or baked it is removed for further processing or eaten directly as desired. With this method it is exceedingly difficult, if not impossible, to obtain uniform thickness of the pancakes and a very thin pancake cannot be obtained in any event. Holes and wrinkles also often appear in the finished product, making it unsuitable for further treatment as described above. This method is obviously quite time consuming and consequently makes the operation commercially expensive, especially when a superior product is needed.

For a good description of the prior art including recipes and method of manufacture of "palascintas" see "Sunset" magazine for August 1965, published by Lane Magazine and Book Company, Menlo Park, California.

It is therefore an object of my invention to provide a process for producing thin pancakes which would result in a product much thinner than that normally produced by present methods.

It is another object of my invention to provide a process for producing thin pancakes which would result in a product of superior quality and uniformity.

It is still another object of my invention to provide a process for producing pancakes which would be more rapid and economical than those now in use.

It is yet another object of my invention to provide an apparatus for the practice of my process which would increase the speed of production over that of all methods now in use.

It is a still further object of my invention to provide an apparatus for the practice of my process which would produce a uniform high quality product with the expenditure of a minimum of time and skill on the part of the operator.

These and other objects of my invention will become evident to those skilled in the art from a description which follows, including the drawings which form a part of this specification and are as follows.

Figure 3:
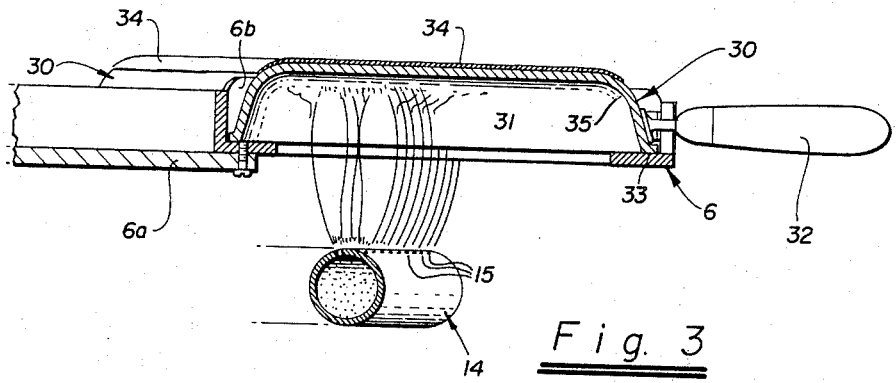
FIG. 3 is a longitudinal section through one of the inverted skillets of my invention and, which forms a part thereof, resting on my carrier frame.
Figure 4:
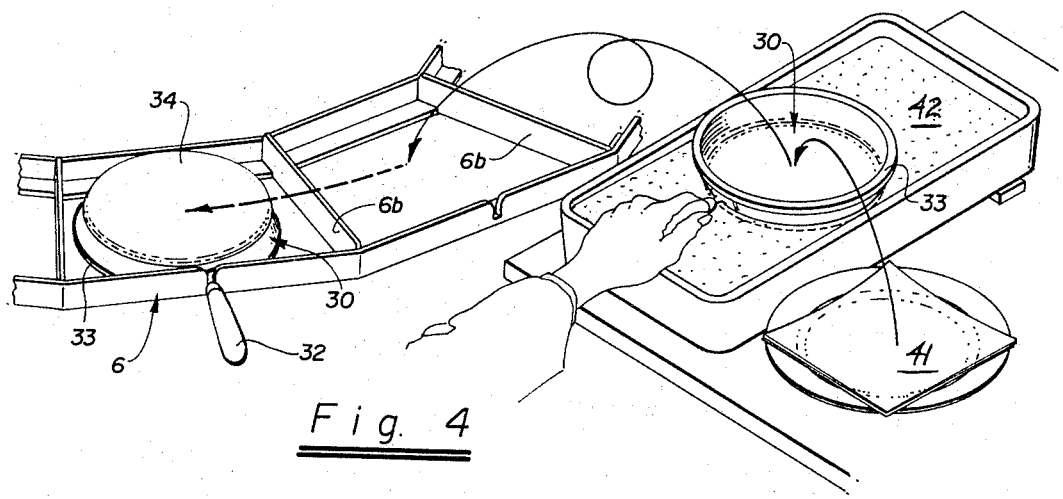
FIG. 4 illustrates the dipping operation at the start of my process.

I have discovered that by utilizing a more or less conventional frying pan or skillet having a curved or rounded lower edge and preferably a slightly outwardly convex bottom surface in an inverted manner I am able to accomplish an important step in my invention and contribute materially to the unusual results which I obtain. This may be best understood by reference first to FIGS. 3 and 4. My pan 30 may be an ordinary iron frying pan, but I prefer to use one of the more superior magnesium, stainless steel, or aluminum alloys which are well known in the art with edges and bottom as stated above. I have found a brand known as "Miracle Made Cookware" of West Bend, Wisconsin to be quite suitable, although others may be used. This may be approxmiately eight or nine inches in diameter, depending upon the diameter of the pancake which it is desired to produce. The concave inner portion 31 may have a depth of approximately one and one-half inches. The pan is equipped with a wooden handle 32 and rounded pan lips or rim 33. An important feature is the vertical circular sides having inner edges 35. The latter may be as much as one inch in inside radius.

Before I start my operation I prepare a suitable pancake batter which may comprise any one of the many recipes known to those skilled in the art. For producing a superior Hungarian "palascinta" I have found the following to be especially suitable, but my process is obviously not confined to it. For each twelve pancakes I use the following ingredients:

3 eggs
6 tablespoons of flour
⅜ teaspoon of salt
1 cup of milk
3 tablespoons of butter.

I beat this until smooth and of the proper viscosity or thickness (consistency), well known in the art.

I next preheat my pan 30 over a gas or electric stove to a proper baking temperature, as is also known in the art. I next dip the outside of what would normally be the bottom of the pan first into a pad saturated with melted butter as seen at 41 in FIG. 4. This coats the outer surface of my pan with a thin layer of butter. I then dip the bottom of the pan into my bowl of previously prepared batter 42 and quickly spin it through 180 degrees, preferably by rapid twisting of the handle 32, so that the layer of pancake batter which has now adhered to the bottom of my pan is facing upward. During this operation an unusual combination of effects takes place. The batter, of course, tends to run across the horizontal surface which may be slightly convex and down the vertical edges of my pan around the curved periphery, by the force of gravity. This tends to stretch the entire body of the batter out to a minimum of thickness uniformly. In the meantime, the heat of the pan acts on the batter so that the outer edge cannot run down too far and initial jelling or congealment of the batter takes place. The pancake assumes its shape shown at 34 in FIGS. 3 and 4.

Figure 5:
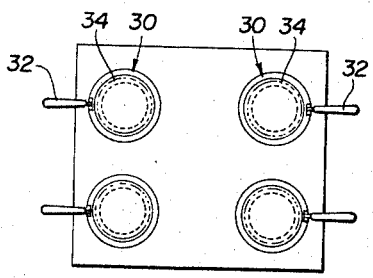
FIG. 5 shows the operation of my process by the batch rather than the continuous method.

I then place my pan in its same inverted position over one of the burners as shown in FIG. 5, or on my rotating carrier 6, more fully described below. In the former I utilize what I call my batch process and in order to increase the rate of production I use a multiplicity of burners as shown. I have discovered further that by using my pan in this inverted position I obtain much more uniform and rapid heat transfer. The cavity formed by the under concave side 31 of the pan seems to act as a unique oven, or heat conducting and transfer medium to produce these unusual results. Of course, the intensity of the flame or electrical heat employed must be regulated to suit varying external conditions, fuels, etc., but is easily adjustable by one skilled in the art. The important thing is that in any case the heat transfer is very rapid and very uniform. When coupled with the uniformity of the pancake itself, achieved as described above, plus its thinness I am able to bake the entire pancake from one side and produce a fine, translucent, thin, tender, and delicately browned product throughout. This entire operation I am able to accomplish in most instances in slightly more than one minute and the pancake produced may be less than one sixty-fourth of an inch in thickness if desired. The latter may be controlled by the amount of batter which I cause to adhere to my pan which in turn may be varied somewhat by the consistency of the batter itself, all in accordance with the desires of the operator using very little special skill.

Just as soon as the pancake has browned through, I lift the pan and remove the pancake with the fingers and place it in a stack for further processing or immediate consumption. The thin and uniform product resulting from my invention is suitable for placing in substantial stacks without sticking together and is also readily adapted to refrigeration and storage for eventual use in any of the manners heretofore described.

It should now be evident that I have discovered that in order to produce the special product described herein, it is necessary, among other things, to reverse all the prior art. In other words, it is necessary to use the bottom instead of the top of the frying pan for producing the product in the unusual manner described herein.

The old method of frying pancakes necessitated running the batter uphill. I use gravity in the novel manner described herein.

Figure 1:
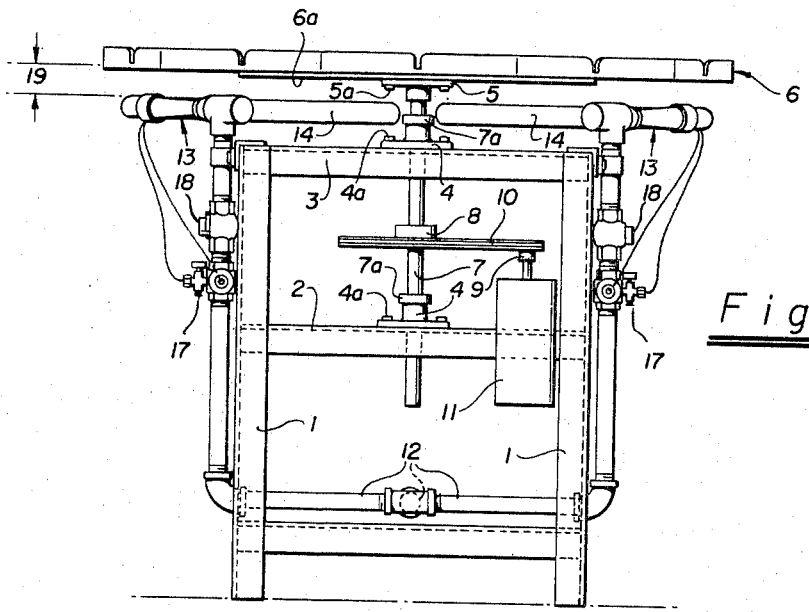
FIG. 1 is an elevation view of the apparatus of my invention with the covers removed to show the operating mechanism.
Figure 2:
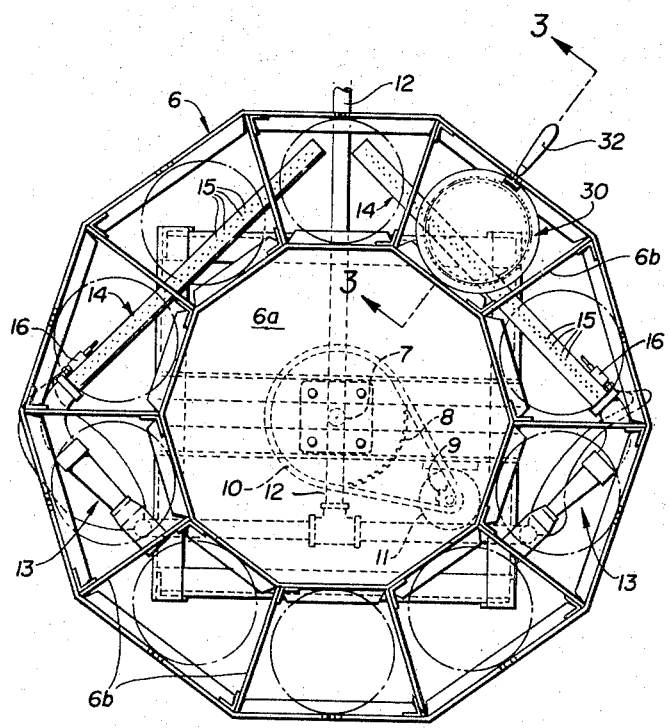
FIG. 2 is a plan view of the apparatus of my invention showing one of my inverted skillets in position for cooking.

It should now be further evident to those skilled in the art that as a result of my invention of the process just described I am able to make a great contribution to the art of pancake manufacturing by utilizing my process in connection with a continuous manufacturing machine or apparatus which forms an important part of my invention and a great innovation to the industry. It should now be also evident further to those skilled in the art that the old prior art method of manufacture described above does not readily lend itself to any degree of mechanization because of the great deal of manual handling which is necessary and the impossibility in producing a uniform product. My process, however, lends itself to a continuous method and may be entirely mechanized, not only resulting in a great saving in manufacturing costs, but still further insuring uniformity of the finished product. Reference should now be had to FIG. 1 and FIG. 2.

The apparatus for use with my invention comprises an angle iron frame 1 which may be of welded steel construction. Also welded to it may be drive platform 2 and bearing support 3. Upper and lower pedestal bearings 4 are fastened to the bearing supports by means of bolts 4a as shown. A flanged coupling 5 is fastened by means of bolts 5a to a rotating carrier frame 6. The latter comprises a center plate 6a to which are secured carrier frame sections of generally trapezoidal shape 6b. The center plate may be ordinary three-sixteenth inch steel plate, while the carrier frame sections may be of aluminum angle iron approximately one inch by one-eighth inch. The frame sections 6b are hollow, of course, for reasons which will become apparent and the legs of the angle iron serve to support my pans, as will also be explained later. In the embodiment shown I employ ten such carrier sections, my rotating frame thus assuming the geometric shape of a decagon.

The vertical drive shaft 7 which may be keyed or otherwise fastened to the flange coupling 5 is equipped with thrust collars 7a which bear against the face of the pedestal bearings 4. A driven sprocket 8 is set-screwed or keyed to shaft 7. Driven sprocket 8 connects to driving sprocket 9 by means of a roller or other type of suitable chain 10. Driving sprocket 9 is mounted on the output shaft of a geared-head motor 11 which in turn is supported on the motor platform 2. For an embodiment of the size illustrated here, I have found that a one-tenth horsepower motor having a geared-head output speed of six r.p.m. is satisfactory. Utilizing a six to one sprocket ratio I obtain a rotative speed of my carrier frame of one r.p.m.

As a source of heat for my apparatus I may utilize a gas supply shown at 12 which feeds into gas mixing nozzles or venturis 13 connecting to gas manifolds 14 positioned just under my rotating carrier frame. The gas manifolds 14 are positioned diagonally as shown and equipped with a multiplicity of gas flame jets 15. Gas pilot lights 16, gas pilostats, and gas regulating valves 17 and 18 are provided as shown. One of my inverted skillets is shown in position on the carrier frame at 30 on FIG. 2.

*Operation*

At the commencement of my operation of my continuous process I first ignite gas flame jets 15 and regulate their intensity by means of regulating valves 18 based on previous experience and local variable conditions which is readily determinable by those skilled in the art. I next place ten of my pans or skillets in their respective positions on the carrier frame around the periphery of my revolving member. The motor is started and the pans allowed to attain a uniform heat.

In the meantime I will have prepared my batter 42 and my butter impregnated pad 41, as with the batch process described above, and locate these adjacent to my apparatus. The dipping process in this case is exactly like that described in the batch process, except that in this case I remove each pan in turn, dab it with the butter, dip it into the batter, quickly spin it through one hundred and eighty degrees and replace it on my revolving carrier as shown on FIG. 4 and repeat with each pan in turn while the carrier 6 is rotating. With the mechanism as described above, my rotating carrier frame turns one r.p.m. so that by the time my first pan makes one revolution, the pancake is completely baked. I then rapidly remove the pan, take the pancake off, and put it in a stack, re-dip the pan again and replace it on the rotating carrier frame from my vantage point. All this takes less time to perform than it does to describe and I am then in the business of producing pancakes at the rate of ten per minute or six hundred per hour. This is considerably faster than any method that has been heretofore used.

While I have shown here the same dipping process used for both the batch and the continuous operations, it is evident to those skilled in the art that I am able to completely mechanize my dipping operation, as well as my pancake removing step wherever the volume of the production justifies it and this would be the case in wholesale production of pancakes as a frozen food product or otherwise.

In addition to the greater speed and efficiency which I have been able to obtain, I have noted that the continuous process as described above still further improves the quality and uniformity of the product. This may be attributed to the fact that the timing is automatic, but is also partly due to the arrangement which I have shown between the gas flame jets 15 and the pans 30 acting through space 19. It will be noted that the travel of the inverted pans is of such nature that it sweeps across the jets, thus providing uniform heat application, preventing overheating or underheating and producing a superior product.

In operating this apparatus the operator, of course, may stand at any convenient point, depending on the layout of the rest of the plant, just so long as he is in easy reach of the batter.

In the embodiment disclosed, my rotating carrier frame may be approximately thirty-nine inches in diameter and stand a distance of three feet from the floor, the supporting frame being two feet by two feet by two feet six inches in height.

While I have described a preferred embodiment of my invention, I do not limit myself to that herein disclosed, except as I do so in the claims which follow.

I claim:

1. The process of making very thin pancakes and the like comprising the steps:

providing a frying pan having a slightly convex external bottom frying surface;
   preheating said frying pan, said pan having slightly outwardly convex vertical circular sides;
   dipping the external bottom surfaces of said pan into a suitable pancake batter thereby causing a film of batter to adhere to the external bottom of said pan;
   rapidly inverting said pan so that said film will be positioned on top of said pan;
   permitting said film to spread horizontally and to run down the outside of said vertical circular sides of said pan to stretch the film to reduce the thickness of the film while the heat of said pan causes said film to congeal on said pan;
   placing said pan in its inverted position upon a heat source; and
   permitting said pan to remain on said heat source until the pancake has become completed.

2. A process of making very thin crepe type pancakes and the like comprising the steps of: providing a circular convex frying surface, the central area of said frying surface having a radius of curvature which is less than the radius of curvature adjacent the edge of said surface, preheating the frying surface, providing a batter, dipping the frying surface downwardly into the crepe batter while in a preheated condition to cause a thin film of batter to adhere to the frying surface, removing the frying surface from the batter, rapidly inverting the frying surface so that the surface faces upwardly, and thinning the batter by drawing the batter outwardly and downwardly over the radius of curvature adjacent the edge of the surface and applying heat to the underside of the frying surface only.

3. A process of making very thin crepe type pancakes and the like comprising the steps of: preheating a frying pan surface, dipping the surface downwardly onto a suitable crepe batter to cause a film of batter to adhere to the frying surface, removing the surface from the batter, rapidly inverting the frying surface so that the surface faces upwardly, thinning the film by drawing the batter downwardly in a convex pattern over the edge of said frying surface, and applying heat to the underside of said frying surface only.

4. A process of making very thin crepe type pancakes and the like comprising the steps of: forming a thin film of batter on a frying surface by drawing the batter over an upwardly facing circular convex guide to obtain uniform gravity urged tension along the periphery of the batter to reduce the thickness thereof and thence heating the pan surface from the underside of the frying surface only to cause cooking of the batter.

References Cited

UNITED STATES PATENTS

| | | | |
|---|---|---|---|
| 1,543,380 | 6/1925 | Harrell | 99—431 |
| 2,786,430 | 3/1957 | Robbins et al. | 107—58 |
| 2,962,985 | 12/1960 | Castronuovo | 107—58 |

WALTER A. SCHEEL, *Primary Examiner.*

J. SHEA, *Assistant Examiner.*